United States Patent
Krauss et al.

(10) Patent No.: US 8,724,754 B2
(45) Date of Patent: May 13, 2014

(54) NOISE POWER THRESHOLDING AND BALANCING FOR LONG TERM EVOLUTION (LTE) SYMBOL DETECTION

(75) Inventors: Thomas P. Krauss, Algonquin, IL (US); Bryan S. Nollett, Fox River Grove, IL (US); Anthony R. Schooler, Bartlett, IL (US)

(73) Assignee: Motorola Mobility LLC, Libertyville, IL (US)

( * ) Notice: Subject to any disclaimer, the term of this patent is extended or adjusted under 35 U.S.C. 154(b) by 2 days.

(21) Appl. No.: 13/597,738

(22) Filed: Aug. 29, 2012

(65) Prior Publication Data

US 2014/0064350 A1    Mar. 6, 2014

(51) Int. Cl.
*H04B 7/10*    (2006.01)

(52) U.S. Cl.
USPC .......................................................... 375/347

(58) Field of Classification Search
USPC .......................................... 375/347, 340, 346
See application file for complete search history.

(56) References Cited

U.S. PATENT DOCUMENTS

| | | | |
|---|---|---|---|
| 7,065,166 B2 * | 6/2006 | Singh et al. ................... | 375/346 |
| 7,379,445 B2 | 5/2008 | Guo et al. | |
| 7,555,067 B2 * | 6/2009 | Jeong ............................. | 375/340 |
| 7,720,169 B2 | 5/2010 | Reuven et al. | |
| 7,822,150 B2 | 10/2010 | Davis et al. | |
| 2007/0053417 A1 * | 3/2007 | Nagata et al. ................. | 375/147 |
| 2011/0051858 A1 | 3/2011 | Salvekar et al. | |
| 2011/0249779 A1 * | 10/2011 | Miao et al. .................... | 375/347 |

FOREIGN PATENT DOCUMENTS

| | | |
|---|---|---|
| EP | 1860793 A1 | 11/2007 |
| WO | 2010072893 A1 | 7/2010 |

* cited by examiner

*Primary Examiner* — Jaison Joseph

(57) ABSTRACT

A noise thresholder of a baseband modem integrated circuit (BMIC) compares measured noise variances on corresponding receiver paths to a pre-established threshold minimum value. The noise thresholder assigns as a noise variance value for a corresponding receiver path either (a) a measured noise variance value for each receiver path having a measured noise variance that is larger than the pre-established threshold minimum, and (b) the pre-established threshold minimum value for each receiver path having a measured noise variance that is less than or equal to the pre-established threshold minimum value. A noise balancer performs noise balancing to provide a same signal to noise ratio (SNR) across all receiver paths, based on the assigned noise variances provided at the noise thresholder. A detection engine utilizes a lowest assigned noise variance value and outputs yielded by the noise balancer to simplify equalization computations while providing a high performance symbol detection capability.

20 Claims, 7 Drawing Sheets

NOISE POWER THRESHOLDING AND BALANCING FOR LONG TERM EVOLUTION (LTE) SYMBOL DETECTION

BACKGROUND

1. Technical Field

The present disclosure relates in general to signal communication devices and in particular to diversity receivers. Still more particularly, the present disclosure relates to data symbol detection in diversity receivers.

2. Description of the Related Art

An ever increasing demand for wireless communication services has driven requirements for higher data throughput and greater capabilities within wireless communication devices. Unfortunately, performance degradation generally accompanies increased data rates and greater device capabilities. As a result, detection systems for wireless communication devices are challenged to compensate for this performance degradation by providing better receiver processing and detection capabilities. Traditionally, wireless communication devices use some form of equalization and/or maximum likelihood detection mechanisms to compensate for performance degradation. The performance degradation can be caused by burst noise, fading and delay distortion resulting from having multiple signal paths between a transmitter and a receiver. As wireless communication devices provide an ever increasing range of capabilities, processing complexity increases. Furthermore, when implemented with finite-arithmetic hardware, traditional equalization and detection algorithms require a significant number of bits for full fidelity. To reduce hardware implementation cost, the number of bits may be reduced but the algorithms suffer a corresponding performance degradation. There is a need to develop reasonable cost hardware implementations with reduced bit-widths while maintaining good performance.

BRIEF DESCRIPTION OF THE DRAWINGS

The described embodiments are to be read in conjunction with the accompanying drawings, wherein.

DETAILED DESCRIPTION

Figure 1:
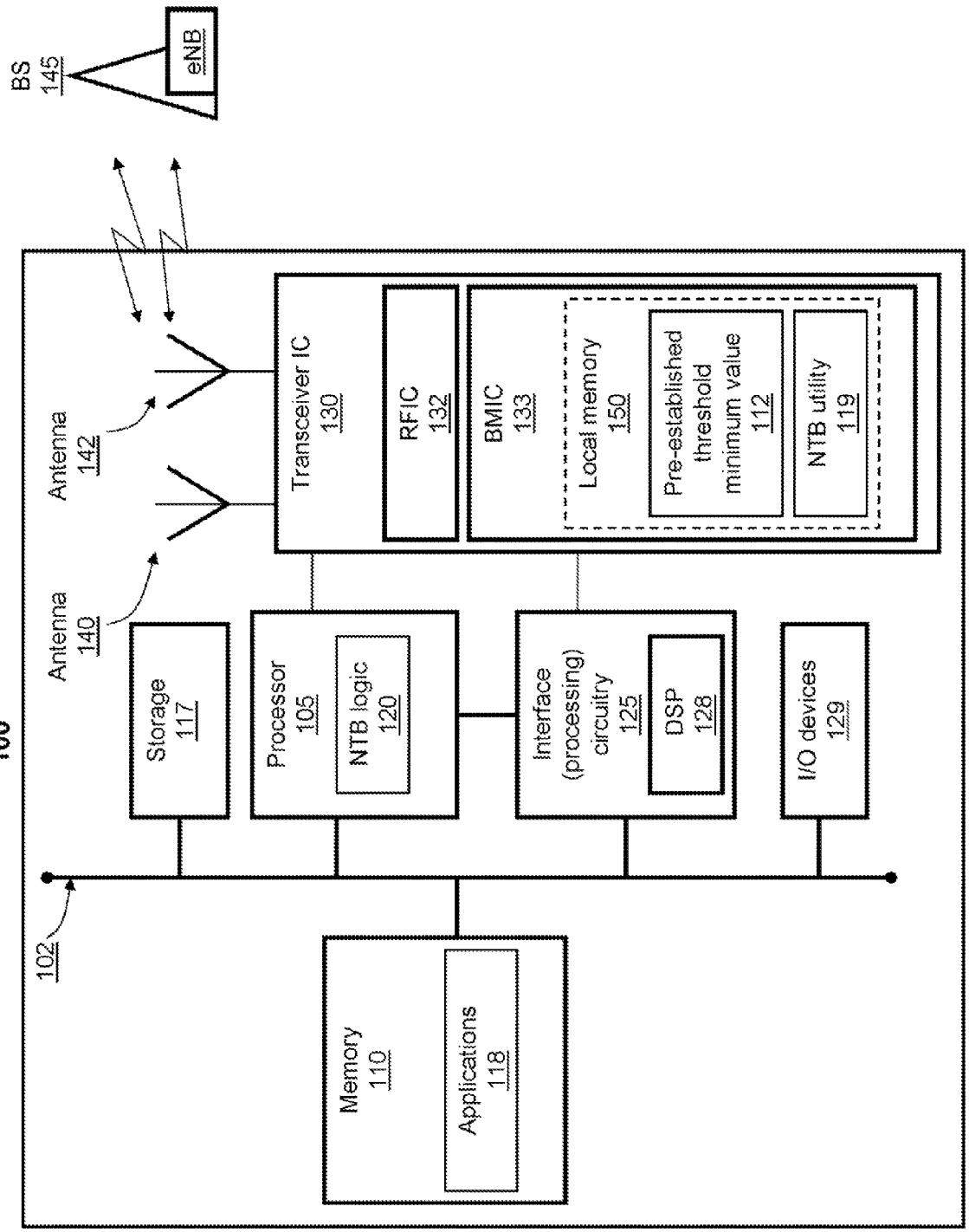
FIG. 1 is a block diagram illustrating an example wireless communication device within which the various features of the described embodiments can be advantageously implemented, according to one embodiment.

The illustrative embodiments provide a method and system for assigning noise variance values to receiver paths and balancing noise across various diversity receiver paths to enable efficient data symbol detection in a wireless communication device. A noise thresholder of a baseband modem integrated circuit (BMIC) compares measured noise variances on corresponding receiver paths to a pre-established threshold minimum value. Based on a result of the comparison, the noise thresholder assigns as a noise variance value for a corresponding receiver path either (a) a measured noise variance value for each receiver path having a measured noise variance that is larger than the pre-established threshold minimum, and (b) the pre-established threshold minimum value for each receiver path having a measured noise variance that is less than or equal to the pre-established threshold minimum value. At least one of the assigned noise variance values is subsequently utilized to enhance efficiency during at least one of a noise balancing process and data symbol detection process in the wireless communication device. In particular, a noise balancer performs noise balancing to provide a same signal to noise ratio (SNR) across all receiver paths, based on the assigned noise variances provided at the noise thresholder. A detection engine utilizes a lowest assigned noise variance value and outputs yielded by the noise balancer to simplify equalization computations while providing a high performance symbol detection capability. The various aspects of the method are described below with reference to the figures and in particular with reference to the flow charts of FIGS. 5-7.

In the following detailed description of exemplary embodiments of the disclosure, specific exemplary embodiments in which the various aspects of the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

With specific reference now to FIG. 1, there is depicted a block diagram of an example wireless communication device 100, within which the functional aspects of the described embodiments may advantageously be implemented. Wireless communication device 100 represents a device that is adapted to transmit and receive electromagnetic signals over an air interface via uplink and/or downlink channels between the wireless communication device 100 and communication network equipment (e.g., base-station 145) utilizing at least one of a plurality of different communication standards, including Worldwide Interoperability for Microwave Access (WiMAX) and Long Term Evolution (LTE). In one or more embodiments, the wireless communication device 100 can be a mobile cellular device or mobile phone or smartphone, or a laptop, netbook or tablet computing device, or other types of communication devices. Wireless communication device 100 comprises processor 105 and interface circuitry 125. Interface circuitry 125 comprises digital signal processor (DSP) 128 (which executes routines written in executable code). Processor 105 and interface circuitry 125 are connected to memory element 110 via signal bus 102. Wireless communication device 100 includes a transceiver integrated circuit 130 for sending and receiving a communication signal including one or more signals from one or more signal initiators. In at least some embodiments, the sending and receiving of communication signals occurs wirelessly and is facilitated by one or more antennas (e.g., antenna 140 and antenna 142) coupled to the transceiver IC 130. The number of antennas can vary from device to device, ranging from a single antenna to two or more antennas for a diversity transceiver configuration, and the presentation within wireless communication device 100 of two antennas is merely for illustration. Transceiver IC 130 comprises radio frequency integrated circuit (RFIC) 132 and baseband modem integrated circuit (BMIC)/baseband integrated circuit (BBIC) 133, which is described in greater detail in FIG. 2. Wireless communication device 100 is able to wirelessly communicate to base transceiver system (BTS)/base-station 145 via antenna 140/142. According to one embodiment, base station 145 is an Evolution Node B (ENodeB) operating within a Long Term Evolution (LTE) network infrastructure.

In one embodiment, BMIC 133 comprises a baseband processor, which can be described as a digital signal processor (DSP), and a memory or storage system. According to one aspect of the disclosure, the memory/storage system includes therein firmware that supports the various processing functions of BMIC 133.

In addition to the above described hardware components of wireless communication device 100, various features of the disclosure may be completed/supported via software and/or firmware code or logic and/or data stored within a controller, system memory 110 (or other storage 117), and/or local memory 150 of BMIC 133. Thus, for example, illustrated within local memory 150 are a number of software/firmware/logic components or modules, including noise thresholder and balancing (NTB) utility 119. Also illustrated stored within local memory 150 is pre-established threshold minimum value 112, which is a data value utilized within various processes described within the disclosure In one implementation, NTB utility 119 is executed by a processing component of BMIC 133.

The various components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

FIGS. 2-7 are described utilizing equations within an appendix of equations comprising A1 and A2. Within the equation appendix, A1 is a first sequence of equations, which includes equations [1] and [2] that describe (a) the receiver system and configuration model, (b) noise thresholding and (c) noise balancing. A2 is a second sequence of equations that includes expression [3] and equations [4], which collectively describe equalization and gain scaling in a maximal ratio combining (MRC) receiver configuration.

According to one aspect of the disclosure, wireless communication device 100 is configured to receive, via multiple parallel channels, signals corresponding to transmission signals that base-station 145 transmits using multiple antennas. At a receiver side of a radio link, wireless communication device 100 receives a corresponding signal using multiple antennas. In the simplest of cases, such a multiple-input multiple-output (MIMO) antenna configuration uses two antennas at the transmitter and two antennas at the receiver resulting in a 2×2 MIMO channel. Base-station 145 is able to encode and modulate two blocks of information bits separately, and transmits, using spatial multiplexing, the resulting two independent and identically distributed (i.i.d.) transmit symbols streams $s_0$ and $s_1$ from different antennas (or "virtual antennas" with the use of precoding or beamforming). Thus, base-station 145 can initiate Single Code Word (SCW) and Multi-Code Word (MCW) MIMO transmissions. In SCW MIMO transmissions, data for both streams is part of the same forward error correction (FEC) code word. However, in MCW MIMO transmissions, data for both streams comes from different FEC code words.

Figure 2:
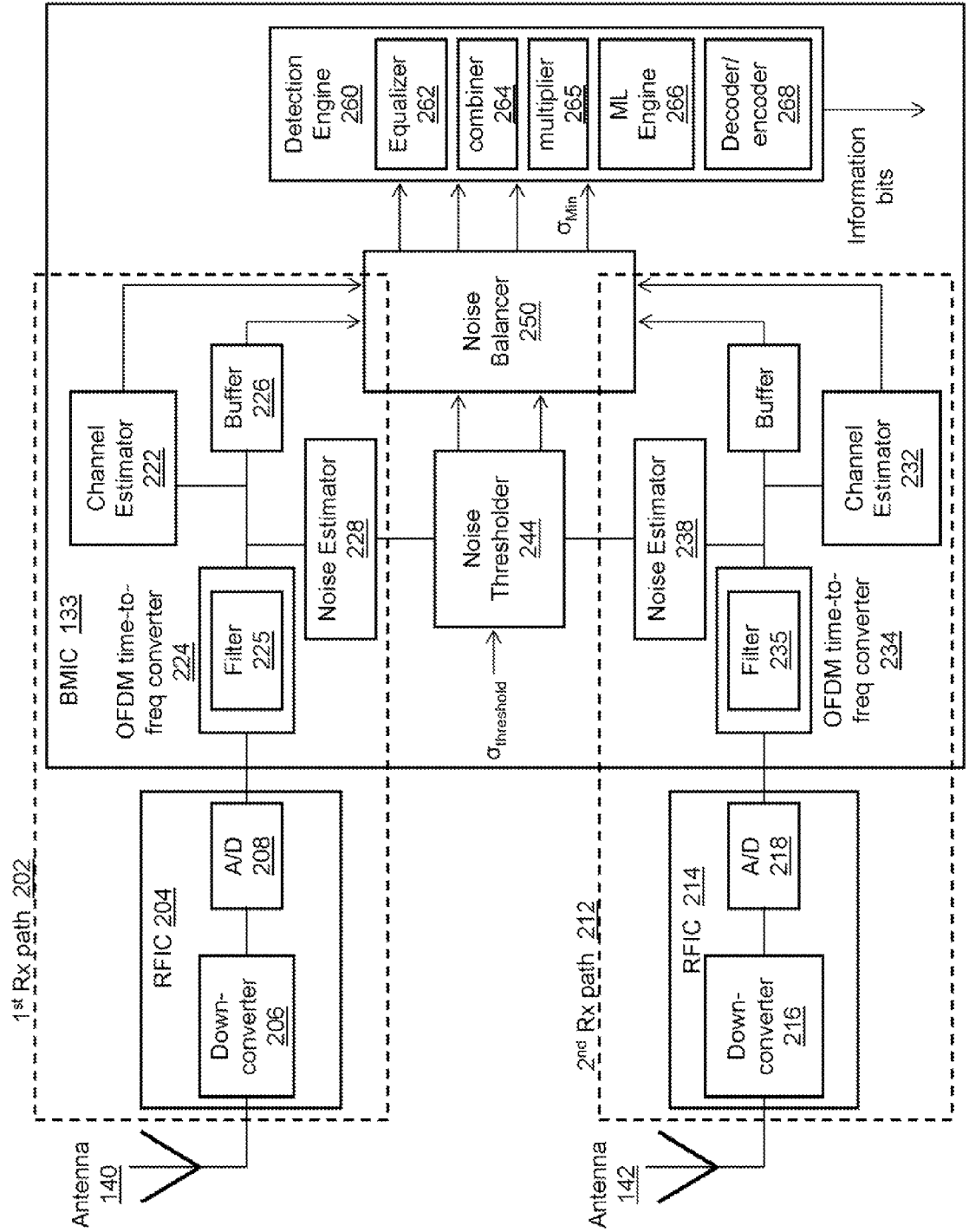
FIG. 2 provides a block diagram representation of a baseband modem integrated circuit (BMIC) with a diversity receiver configuration, according to one embodiment.

FIG. 2 provides a block diagram representation of a baseband modem integrated circuit (BMIC) within a diversity receiver configuration, according to one embodiment. Receiver integrated circuit (IC) 200 comprises first receiver path 202 connected by radio frequency integrated circuit (RFIC) 204 to first diversity antenna 140 and second receiver path 212 connected by RFIC 214 to second diversity antenna 142. BMIC 133 is coupled to RFIC 204 of first diversity path 202 and to RFIC 214 of second diversity path 212. Although two receiver paths are shown, wireless communication device 100 can, in one implementation, be configured with a diversity receiver configuration having a number of receiver paths greater than two receiver paths. For example, BMIC 133 is described in FIG. 3 as being configured with a diversity receiver configuration having four receiver paths. Thus, the description that follows is provided in terms of diversity receiver configurations having two receiver paths, four receiver paths and, more generally, as having multiple receiver paths. A first diversity RF signal is received at first diversity antenna 140. The RF signal undergoes radio frequency (RF) processing at RFIC 204, and the result of the RF processing is provided as a first received sample sequence $x_0(n)$, which is a time domain baseband signal, along first receiver path 202 to BMIC 133. In one embodiment, RF processing at RFIC 204 includes amplification, conversion of received samples from time to frequency domain, filtering, demodulation and sampling (e.g., an analog to digital conversion) stages. In a similar manner, a second diversity signal is received at second diversity antenna 142, undergoes radio frequency (RF) processing at RFIC 214, and the resulting signal is provided as a second received sample sequence $x_1(n)$ (i.e., a time domain baseband signal) propagated along second receiver path 212 to BMIC 133. The received sample sequences $x_0(n)$ and $x_1(n)$ each have contributions from both transmit signals $s_0$ and $s_1$.

BMIC 133 comprises, within first receiver path 202, OFDM time-to-frequency domain converter 224 and buffer 226. OFDM time-to-frequency domain converter 224 includes digital filter 225. In addition, BMIC 133 includes channel estimator 222 and noise estimator 228 which are both connected to first receiver path 202. Along first diversity receiver path 202, channel estimator 222 provides an estimate of the channel impulse response $H'_0$ (which is a 2×1 vector that is also referred to herein as the channel response) of the channel over which a first pilot signal was received. The pilot signal is propagated over the same channel on which the first transmit signal corresponding to the received (baseband) sample sequence $x_0$ is propagated. Similarly, along second diversity receiver path 212, channel estimator 232 provides an estimate of the channel response $H'_1$. In one embodiment, first noise variance estimator 228 uses first channel response estimate $H'_0$ to measure a noise variance on first receiver path 202. Similarly, second noise variance estimator 238 uses second channel response estimate $H'_1$ to measure a noise variance on second receiver path 212. In one implementation, a single channel estimator and/or a single noise estimator is utilized for both the first and second receiver paths instead of a separate channel estimator and a separate noise estimator for each corresponding receiver path. In one embodiment, the noise estimator performs noise estimation using pilot signals, instead of channel estimates.

Equation [1] (A1) describes a system model in which two data streams are transmitted using N antennas and received using two antennas. Channel estimator 222 at the BMIC 133 is responsible for producing exactly 2×2 channel estimates. Thus, in equation [1], x' is a 2×1 vector of received symbols at two antenna ports, s is a 2×1 vector of transmitted symbols (e.g., QPSK, 16-QAM or 64-QAM) and H' is a 2×2 matrix of channel response estimates on four possible paths between transmitter and receiver. Channel estimate $h'_{ij}$ of $H'_i$ refers to $i^{th}$ receive antenna $j^{th}$ stream. The vector n' is a 2×1 vector of noise estimates on two antenna ports at the receiver. In equation [1] n0' and n1' are noise samples at the $1^{st}$ and $2^{nd}$ receiver paths respectively.

The multiple receiver paths correspond to multiple antennas (e.g., antennas 140 and 142) that are communicatively connected to BMIC 133. The multiple (i.e., two or more) antenna paths can be arranged into sets of paths based on a relationship between a measured noise value on a corresponding receiver path and pre-established threshold minimum value 112 for noise variance. For example, receiver paths having a measured noise variance that is larger than the pre-established threshold minimum can be collectively described as a first set of receiver paths. Receiver paths having a measured noise variance that is less than or equal to the pre-established threshold minimum can be collectively described as a second set of receiver paths. Within BMIC 133, noise thresholder 244 is coupled to first noise estimator 228 and second noise estimator 238 to receive measured noise variances for first receiver path 202 and second receiver path 212. BMIC 133 also includes noise balancer 250 coupled to noise thresholder 244 and detection engine 260 coupled to noise balancer 250. In one embodiment, detection engine 260 is implemented as a multiple input multiple output (MIMO) detector. Noise thresholder 244 compares a measured noise variance on each of the receiver paths to the pre-established threshold minimum value for noise variance. Based on a result of the comparison, noise thresholder 244 assigns to the specific receiver path a noise variance value of either (a) a corresponding measured noise variance value for each receiver path of the first set of receiver paths having a measured noise variance that is larger than the pre-established threshold minimum or (b) the pre-established threshold minimum value for each receiver path from among a second set of receiver paths having a measured noise variance that is less than or equal to the pre-established threshold minimum value. To simplify the description and/or illustration, each receiver path of the first set of receiver paths is identified as a first receiver path and each receiver path from among the second set of receiver paths is identified as a second receiver path. Noise thresholder 244 assigns a noise variance value to each of the plurality of receiver paths, and at least one of the assigned noise variance values is subsequently utilized within BMIC 133 during noise balancing and/or data symbol detection.

In one embodiment, the pre-established threshold minimum value for noise variance utilized within wireless communication device 100 may be retrieved from local memory/storage 150 and provided as an input to noise thresholder 244. In one embodiment, the pre-established threshold minimum value for noise variance can be signaled from the wireless communication network (not shown) to wireless communication device 100 to be utilized by noise thresholder 244. In response to identifying at least one second receiver path among the plurality of receiver paths, noise thresholder 244 assigns the pre-established threshold minimum value as the assigned noise variance value corresponding to each of the at least one second receiver path identified. In response to identifying at least one first receiver path, noise thresholder 244 assigns the measured noise variance as the assigned noise variance value to each of the corresponding at least one first receiver path.

Noise balancer 250 is coupled to noise thresholder 244 and receives the assigned noise variance values for each of the receiver paths. Noise balancer 250 utilizes the assigned noise variances for both receiver paths to determine whether to perform noise balancing. In particular, noise balancer 250 performs noise balancing to scale a magnitude of at least one of (a) a received sample sequence and (b) a channel response estimate, to cause received sample sequences across the plurality of receiver paths to have a substantially equivalent signal-to-noise ratio. Noise balancer 250 generates an adjusted received sample sequence and an adjusted channel response estimate for each first receiver path that has an assigned noise variance value that is greater than a lowest assigned noise variance value from among the plurality of assigned noise variance values. Equation [2] (A1) (i.e., x=Hs+n) describes the system model for receiver IC 200 after noise balancing.

In order to perform noise balancing, noise balancer 250 identifies the lowest assigned noise variance value from among the assigned noise variance values and determines whether at least one first receiver path has an assigned noise variance value that is greater than the lowest assigned noise variance value. In response to determining that at least one first receiver path has an assigned noise variance value that is greater than the lowest assigned noise variance value, noise balancer 250 reduces a magnitude of at least one of a channel estimate and a received sample sequence corresponding to each of the at least one first receiver path.

Noise balancer 250 determines a specific amount of magnitude reduction to perform based on a ratio of a square root of the lowest assigned noise variance value and a square root of a higher, assigned noise variance value corresponding to the first receiver path, as illustrated by Equation [2]. Noise balancer 250 performs the specific amount of magnitude reduction to enable the received sample sequences and adjusted received sample sequences corresponding to the plurality of receiver paths to have a substantially equivalent signal to noise ratio.

According to one aspect of the disclosure, noise balancer 250 performs the magnitude reduction on at least one first receiver path instead of performing a magnitude increase on the receiver path(s) that has an assigned noise variance value equal to the lowest assigned noise variance value. Performing a magnitude reduction rather than a magnitude increase prevents signal clipping of a received sample sequence and preserves a dynamic range of the received sample sequence corresponding to the at least one receiver path having the lowest assigned noise variance value.

Detection engine 260 comprises equalizer 262, combiner 264, multiplier 265, maximum likelihood (ML) engine 266 and decoder/encoder 268. Detection engine 260 performs data symbol detection associated with the plurality of receiver paths utilizing (1) the adjusted received sample sequence and the adjusted channel response estimate for each first receiver path that has an assigned noise variance value that is greater than the lowest assigned noise variance value and (2) a received sample sequence and channel response estimate for each receiver path that has an assigned noise variance value that is equal to the lowest assigned noise variance value.

In one embodiment provided within an maximal ratio combining (MRC) configuration, detection engine 260 utilizes equalizer 262 to generate an equalized received signal for each of the plurality of receiver paths by utilizing: (a) a received sample sequence and a channel response estimate for a receiver path that has an assigned noise variance value equal to the lowest assigned noise variance value and (b) the adjusted received sample sequence and the adjusted channel response estimate for a first receiver path with an assigned noise variance value that is greater than the lowest assigned noise variance value.

In one embodiment, detection engine 260 performs equalization, according to Equation [4] (A2) which utilizes expression [3], by multiplying a channel response estimate by a received sample sequence corresponding to each of the plurality of receiver paths that has an assigned noise variance value that is equal to the lowest assigned noise variance value. As a result, detection engine 260 provides at least one corresponding equalized received signal. However, for each first receiver path whose assigned noise variance value is greater than the lowest assigned noise variance value, detection engine 260 multiplies an adjusted channel response estimate by an adjusted received sample sequence to provide at least one corresponding equalized adjusted received sample sequence. Equation [4] provides an equalization process that is performed by detection engine 260. For each receiver path that has an assigned noise variance value that is less than or equal to the lowest assigned noise variance value, the equalized received signal has a gain that is substantially equivalent to a square of a channel magnitude of the channel response estimate. On the other hand, the equalized received signal has a gain that is substantially equivalent to a square of a channel magnitude of the adjusted channel response estimate for each receiver path that has an assigned noise variance value that is greater than the lowest assigned noise variance value.

Detection engine 260 employs combiner 264 to add together all equalized (adjusted and/or unadjusted) received signals to provide an equalized combined signal. Detection engine 260 then generates a scaled, equalized combined signal by multiplying the equalized combined signal by a mathematical inverse of the lowest assigned noise variance value.

Detection engine 260 generates the scaled, equalized combined signal by performing a single multiply operation. The single multiply operation is enabled as a result of performing the noise balancing utilizing the lowest assigned noise variance value. Detection engine 260 is able to perform the single multiply operation by first generating an equalized combined signal and then scaling the equalized combined signal. The single multiply operation enables BMIC 133 to reduce a number of operations and an amount of processing resources required to process received data.

In one embodiment, detection engine 260 performs data detection by utilizing ML engine 266 to execute at least one of bit probability detection and log likelihood ratios (LLRs) utilizing at least one of: (a) a received sample sequence and a channel response estimate for a corresponding receiver path and (b) an adjusted received sample sequence and an adjusted channel response estimate for a first receiver path. According to one aspect of the disclosure, detection engine 260 performs data symbol detection in a diversity combining receiver configuration that employs any one of a variety of data symbol detection technologies, including (a) minimum mean square error (MMSE) processing; (b) maximal ratio combining (MRC) processing; (c) maximum likelihood (ML) processing; and (d) maximum likelihood successive interference cancellation (ML-SIC) processing.

Those of ordinary skill in the art will appreciate that the hardware components and basic configurations depicted in FIGS. 1 and 2 may vary. The illustrative components are not intended to be exhaustive, but rather are representative to highlight essential components that can be utilized to implement aspects of the described embodiments. For example, other devices/components may be used in addition to or in place of the hardware and/or firmware depicted. The depicted example is not meant to imply architectural or other limitations with respect to the presently described embodiments and/or the general disclosure.

Figure 3:
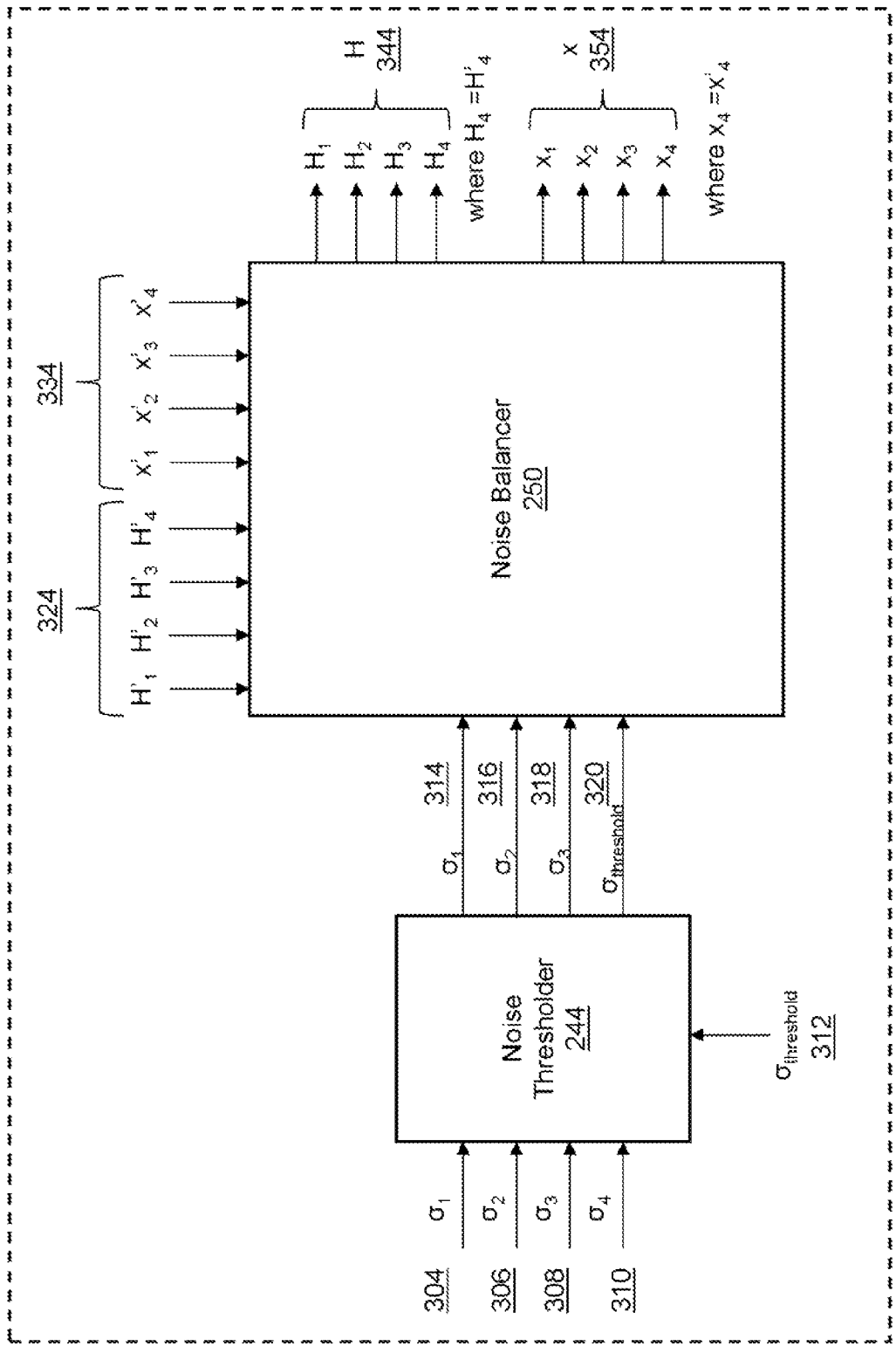
FIG. 3 is a block diagram illustrating the BMIC of FIG. 2 configured with a noise thresholder and a noise balancer, according to one embodiment.

FIG. 3 is a block diagram illustrating signal processing within BMIC utilizing a noise thresholder and a noise balancer, according to one embodiment. BMIC 133 comprises noise thresholder 244 and noise balancer 250. As illustrated, noise thresholder 244 comprises four input ports illustrated by input ports 304, 306, 308 and 310 corresponding to four receiver paths. Noise thresholder 244 receives four noise variance values $\sigma_1^2$, $\sigma_2^2$, $\sigma_3^2$, and $\sigma_4^2$. In the particular illustration of FIG. 3, noise thresholder 244 receives standard deviation values $\sigma_1$, $\sigma_2$, $\sigma_3$, and $\sigma_4$, corresponding to the four receiver paths. In addition, noise thresholder 244 has a fifth input port 312 to receive the pre-established threshold minimum value "$\sigma_{threshold}^2$". Noise thresholder 244 comprises four output ports that are coupled to four corresponding input ports of noise balancer 250. The four input ports of noise balancer 250 provide noise variance values (or corresponding standard deviation of noise values) assigned by noise thresholder 244 to corresponding receiver paths and are illustrated by input ports 314, 316, 318 and 320.

Noise balancer 250 comprises input ports to receive (a) channel response estimates from a channel estimator (222) and (b) received sample sequences from corresponding receiver paths. As illustrated, the channel response estimates are collectively referred to as the matrix H' and are received as H'$_1$, H'$_2$, H'$_3$ and H'$_4$ at corresponding input ports 324. H'$_i$ represents a 4×1 vector. The received sample sequences are collectively referred to as the vector x' and are received as x'$_1$, x'$_2$, x'$_1$ and x'$_4$ at corresponding input ports 334. In one embodiment, the H' and x' vectors provide frequency domain values that are generated by OFDM time-to-frequency domain converter 224. Noise balancer 250 comprises output ports 344 that provide channel response estimates and/or adjusted channel response estimates, following the execution of corresponding noise balancing functions. As illustrated, noise balancer provides H$_1$, H$_2$, H$_3$ and H$_4$ at output ports 344. In the illustration of FIG. 3, H is used to refer to an output (i.e., noise balanced) matrix yielded by noise balancer 250 and which can include at least one of a channel response estimate and an adjusted channel response estimate. On the other hand, H'(written as a letter H followed by a tilde notation) is an input received at noise balancer 250 that is associated exclusively with unadjusted channel response estimates. In addition, noise balancer 250 comprises output ports 354 that provide received sample sequences and/or adjusted received sample sequences, following a noise balancing stage. As illustrated, noise balancer 250 provides x$_1$, x$_2$, x$_3$ and x$_4$ at output ports 354. As illustrated in FIG. 3, x$_4$ is equal to x'$_4$. In the illustration of FIG. 3, "x" refers to an output vector provided by noise balancer 250 that includes either one of or both received sample sequences and adjusted received sample sequences. On the other hand, x'(written as a letter x followed by a tilde) is an input received at noise balancer 250 that is associated only with unadjusted received sample sequences.

Noise thresholder 244 receives four measured noise variance values $\sigma_1^2$, $\sigma_2^2$, $\sigma_3^2$, and $\sigma_4^2$ corresponding to four receiver paths. Noise thresholder 244 compares a measured noise variance on each of the receiver paths to a pre-established threshold minimum value for noise variance (i.e., $\sigma_{threshold}^2$). Based on a result of the comparison, noise thresholder 244 assigns for each receiver path a noise variance value of either (a) a corresponding measured noise variance value for each receiver path of a first set of receiver paths having a measured noise variance that is greater than the pre-established threshold minimum or (b) the pre-established threshold minimum value for each receiver path from among a second set of receiver paths having a measured noise variance that is less than or equal to the pre-established threshold minimum value.

In response to identifying at least one second receiver path among the plurality of receiver paths, noise thresholder 244 assigns the pre-established threshold minimum value as the assigned noise variance value corresponding to each of the at least one second receiver path identified. In the illustration of FIG. 3, noise thresholder 244 determines that $\sigma_4$, which corresponds to receiver path 4, is less than or equal to the pre-established threshold minimum value for noise variance (i.e., $\sigma_{threshold}^2$) and assigns $\sigma_{threshold}$ as the noise variance value corresponding to receiver path4. Noise thresholder 244 provides $\sigma_{threshold}^2$ to noise balancer 250 via input port 320 as a noise variance value assigned to receiver path4.

In response to identifying at least one first receiver path, noise thresholder 244 assigns the measured noise variance as the assigned noise variance value corresponding to each of the at least one first receiver path. In the example of FIG. 3, noise thresholder 244 respectively assigns measured noise variances $\sigma_1^2$, $\sigma_2^2$ and $\sigma_3^2$ as assigned noise variance values corresponding to receiver path1, receiver path2 and receiver path3. Noise thresholder 244 provides currently assigned noise variances $\sigma_1^2$, $\sigma_2^2$ and $\sigma_3^2$ to noise balancer 250 via input port 314, input port 316, and input port 318, respectively.

Noise balancer 250 utilizes the assigned noise variances for the four receiver paths to determine whether to perform noise balancing. Noise balancer 250 performs noise balancing to scale a magnitude of at least one of (a) a received sample sequence and (b) a channel response estimate, to cause received sample sequences and/or adjusted received sample sequences across the plurality of receiver paths to have a substantially equivalent noise power or signal-to-noise (SNR) ratio. Noise balancing generates an adjusted received sample sequence and an adjusted channel response estimate for each first receiver path that has an assigned noise variance value that is greater than a lowest assigned noise variance value from among the assigned noise variance values.

Figure 4:
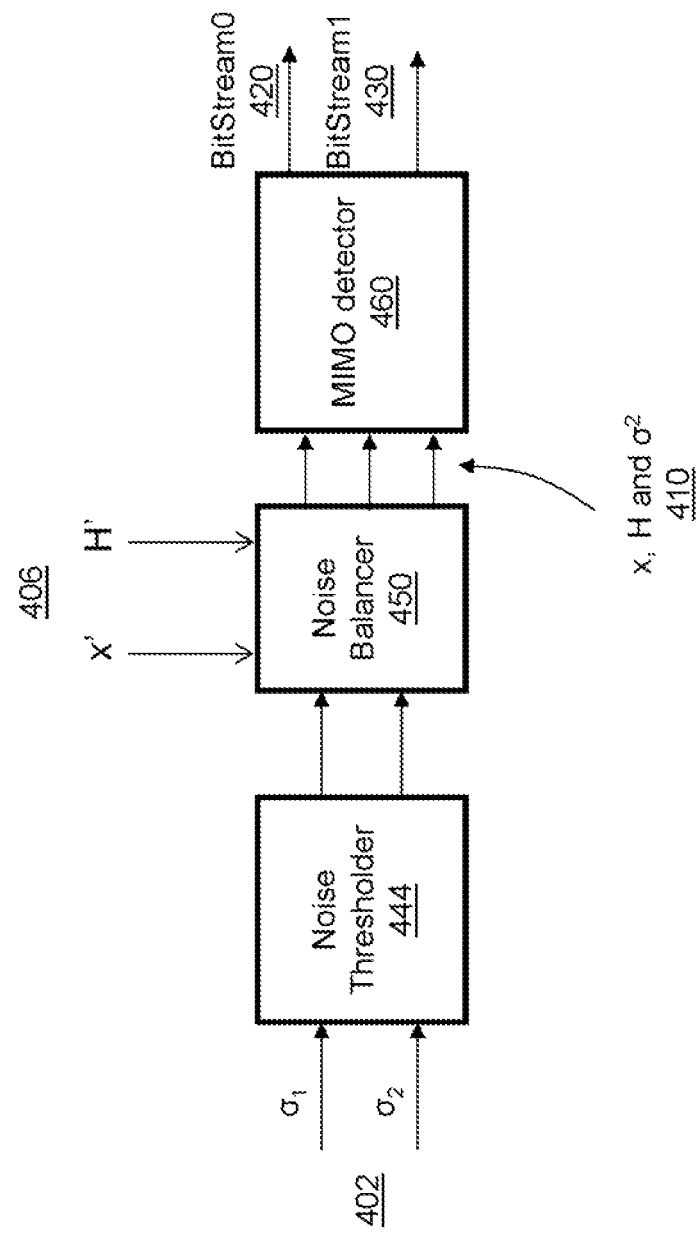
FIG. 4 illustrates a functional block diagram of one implementation of multiple input multiple output (MIMO) detection, according to one embodiment.

In order to perform noise balancing, noise balancer 250 identifies the lowest assigned noise variance value from among the assigned noise variance values and determines whether at least one first receiver path has an assigned noise variance value that is greater than the lowest assigned noise variance value. In the example of FIG. 4, $\sigma_{threshold}^2$ is the lowest assigned noise variance value. In response to determining that at least one first receiver path has an assigned noise variance value that is greater than the lowest assigned noise variance value, noise balancer 250 reduces a magnitude of at least one of a channel response estimate and a received sample sequence corresponding to each of the at least one first receiver path. In the example of FIG. 4, noise balancer 250 reduces magnitudes of the channel estimate and the received sample sequence to provide an adjusted channel response estimate and an adjusted received sample sequence corresponding to each of receiver path1, receiver path2 and receiver path3. However, noise balancer 250 maintains magnitudes of the channel response estimate and the received sample sequence corresponding to receiver path4 without any adjustment.

For each first receiver path having an assigned noise variance value that is higher than the lowest assigned value, noise balancer 250 determines a specific amount of magnitude reduction to perform based on a ratio of a square root of the lowest assigned noise variance value and a square root of the higher, assigned noise variance value corresponding to that of the first receiver path. Noise balancer 250 performs the specific amount of magnitude reduction to enable the received sample sequences and adjusted received sample sequences corresponding to the plurality of receiver paths to have a substantially equivalent signal to noise ratio. Thus, noise balancer 250 provides a magnitude reduction using the scale factors $\sigma_{threshold}/\sigma_1$, $\sigma_{threshold}/\sigma_2$ and $\sigma_{threshold}/\sigma_3$ to scale the magnitudes of the channel response estimates (i.e., H'$_1$, H'$_2$ and H'$_3$) and the received sample sequences (i.e., x'$_1$, x'$_2$ and x'$_3$), corresponding to each of receiver path1, receiver path2 and receiver path3.

FIG. 4 illustrates a functional block diagram of one implementation of MIMO detection in a BMIC, according to a second embodiment. The main functional components of BMIC 400 are similar to those of FIG. 3, and the functionality associated with these components is explained in greater detail within the description of FIG. 3. Different reference numerals are provided to indicate some differences in functionality between the similarly named blocks of FIGS. 3 and 4. BMIC 400 comprises noise thresholder 444, noise balancer 450 and MIMO detector 460. Noise balancer 450 is coupled at first and second input ports of noise balancer 450 to output ports of noise thresholder 444. MIMO detector 460 is coupled to an output port of noise balancer 450. Noise thresholder 444 receives inputs 402 comprising standard deviation values $\sigma_1$ and $\sigma_2$ at a first and second input port. Noise balancer 450 receives inputs 406 comprising (a) received sample sequences x' at a third input port and (b) channel response estimates H' at a fourth input port of noise balancer 450. In one embodiment, MIMO detector 460 comprises an LLR generation module and a decoder (not shown). MIMO detector 460 yields first and second bit streams 420, 430.

In addition to receiving channel response estimates H' and received sample sequences x' from BMIC 400, noise balancer 450 receives corresponding noise variances or standard deviation values from noise thresholder 444. Noise balancer 450 uses the corresponding noise variances to perform noise balancing on the channel response estimates and received sample sequences in order to provide (a) a same, first SNR for channel response estimates and adjusted channel response estimates across all receiver paths and/or (b) a same, second SNR for received sample sequences and adjusted received sample sequences across all receiver paths.

In one embodiment, MIMO detector 460 receives signals 410 comprising x, H and $\sigma^2$ and computes decoded bits based on signals 410. Noise balancer 450 yields signals 410. Signals 410 correspond to signals (e.g., channel response estimates H' and received sample sequences x') that are processed by noise thresholder 444 and noise balancer 450, as described in FIG. 3. In one implementation, MIMO detector 460 uses the LLR generation module to compute LLRs for a first transmit stream (e.g., $s_1$) of the two transmit streams. MIMO detector 460 generates, using the decoder, decoded bit streams 430 for stream $s_1$ using computed LLRs. In one embodiment, MIMO detector 460 subsequently computes LLRs for a second transmit stream and generates decoded bit streams 420 for the second transmit stream using computed LLRs.

Noise thresholder 444 and noise balancer 450 collectively simplifies computations performed at MIMO detector 460 and allows the fixed point computations executed at MIMO detector 460 to be implemented with less hardware. For example, the single multiply operation described in FIG. 2 enables a reduction of multiplier hardware. In one embodiment, MIMO detector 460 represents at least one of: (a) minimum mean square error (MMSE) detection; (b) maximum likelihood (ML) detection; (c) maximal ratio combining (MRC) detection; and (d) maximum likelihood-successive interference cancellation (ML-SIC) detection.

Figure 5:
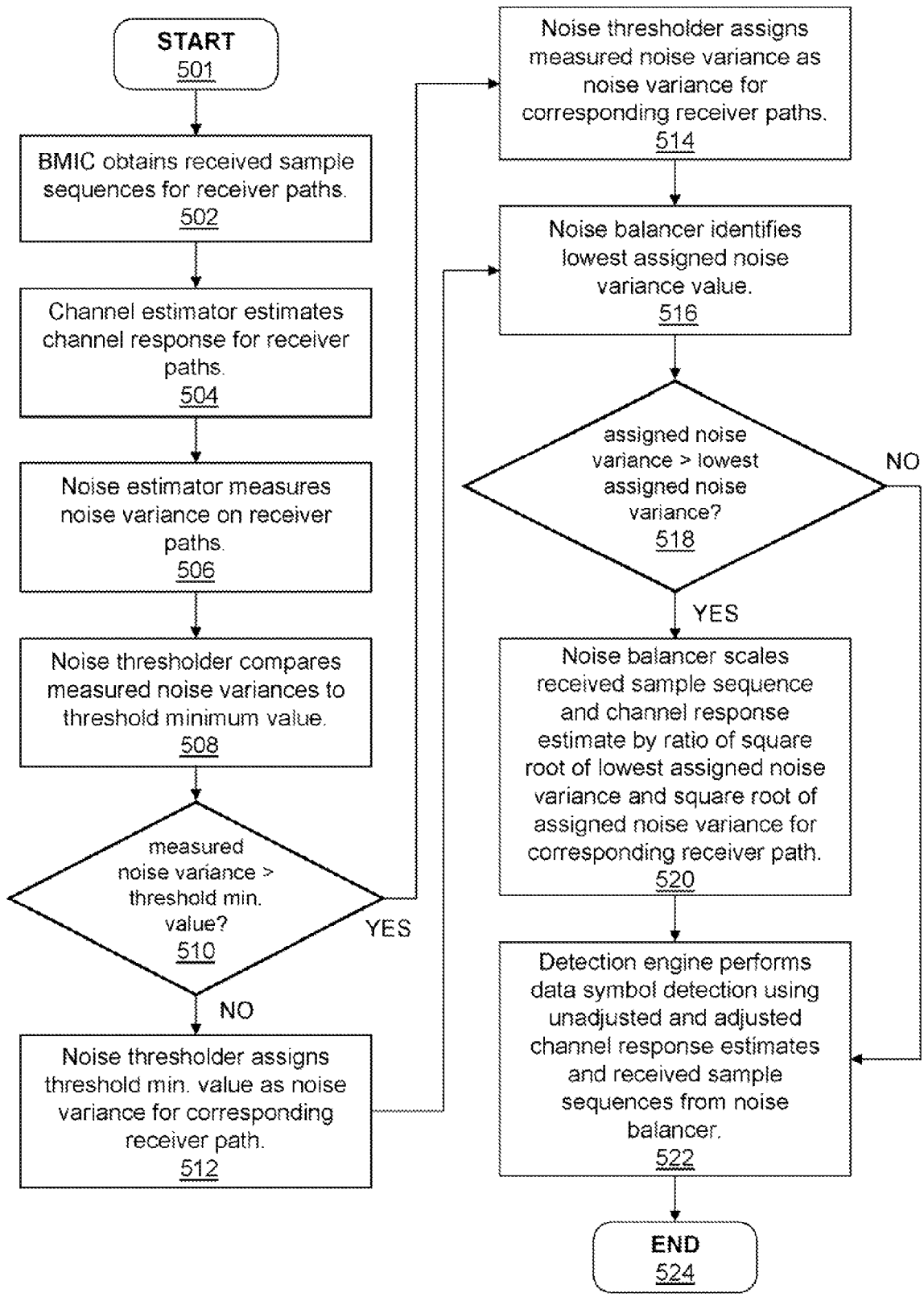
FIG. 5 is a flow chart illustrating one embodiment of a method for performing noise thresholding and noise balancing to provide efficient data symbol detection, according to one embodiment.
Figure 6:
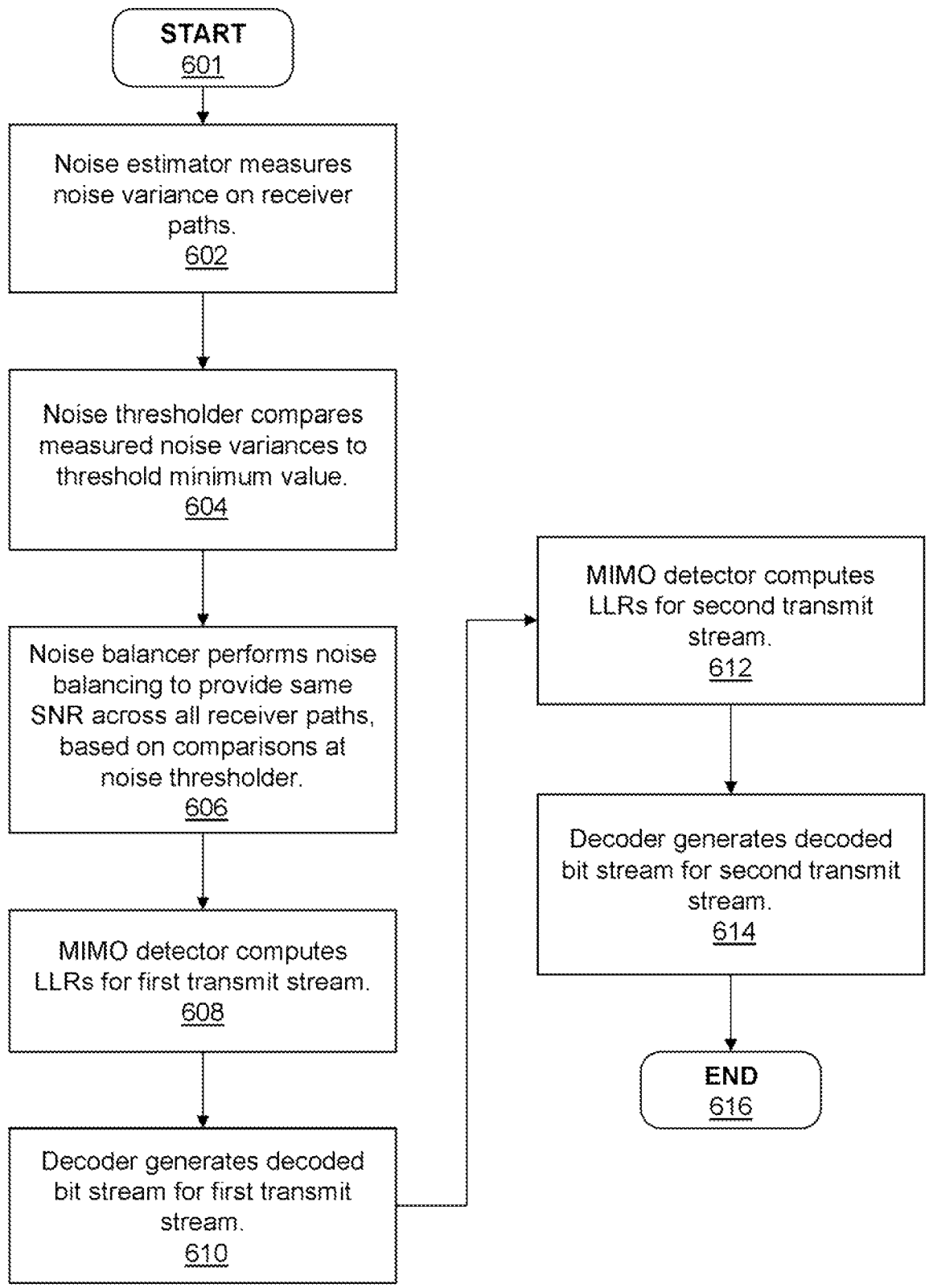
FIG. 6 is a flow chart illustrating one embodiment of a method for performing noise thresholding and noise balancing to provide data symbol detection using a multiple input multiple output (MIMO) receiver configuration, according to one embodiment.
Figure 7:
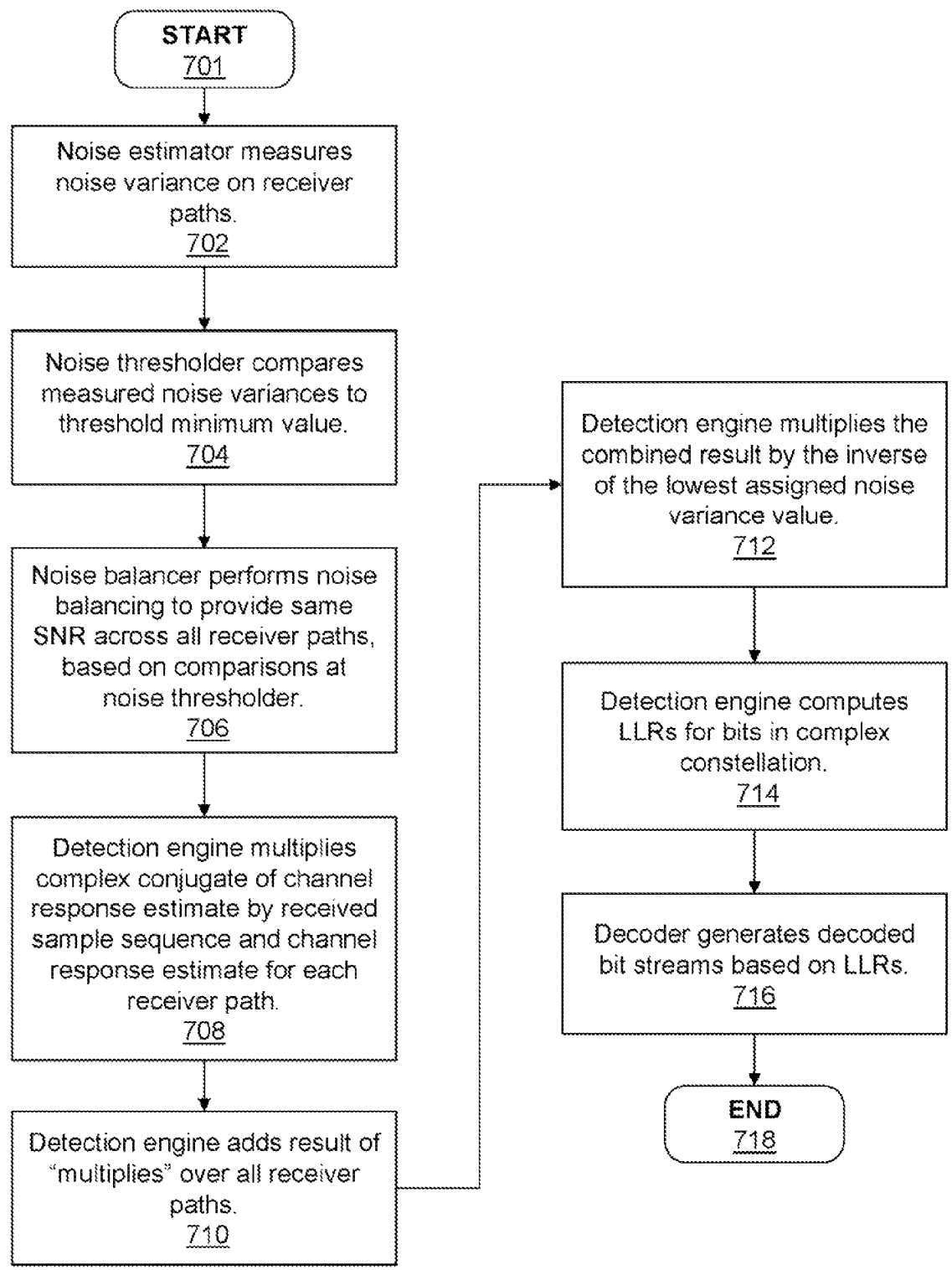
FIG. 7 is a flow chart illustrating one embodiment of a method for performing noise thresholding and noise balancing to provide data symbol detection using a maximal ratio combining (MRC) receiver configuration, according to one embodiment.

FIGS. 5-7 are flow charts illustrating the methods by which the above processes of the illustrative embodiments can be implemented. Although the method illustrated in FIGS. 5-7 may be described with reference to components and functionality illustrated by and described in reference to FIGS. 1-4, utilizing the equations of A1 and A2, it should be understood that this is merely for convenience and alternative components and/or configurations thereof can be employed when implementing the various methods. Certain portions of the methods may be completed by NTB utility 119 executing on one or more processors (e.g., processor 105 or DSP 128) within wireless communication device 100 (FIG. 1), or within BMIC 133 (FIG. 1, 2 or 3), or by receiver 400. The executed processes then control specific operations of or on BMIC 133. For simplicity in describing the methods, all method processes are described from the perspective of BMIC 133 and with specific reference to the functional components presented within FIG. 3.

FIG. 5 is a flow chart illustrating one embodiment of a method for performing noise thresholding and noise balancing to provide efficient data symbol detection, according to one embodiment. The method of FIG. 5 begins at initiator block 501 and proceeds to block 502 at which BMIC 133 obtains received sample sequences for multiple receiver paths. At block 504, channel estimator 222 estimates channel response for corresponding receiver paths. At block 506, noise estimator 228 measures noise variance on the receiver paths. At block 508, noise thresholder 244 compares the measured noise variances to a threshold minimum value. At decision block 510, noise thresholder 244 determines for each receiver path whether a corresponding measured noise variance is greater than a threshold minimum value of noise variance. In response to noise thresholder 244 determining that a corresponding measured noise variance is not greater than a threshold minimum value of noise variance, noise thresholder 244 assigns the threshold minimum value as the noise variance value for a corresponding receiver path, as shown at block 512. However, if at decision block 510 noise thresholder 244 determines that a corresponding measured noise variance is greater than the threshold minimum value of noise variance, noise thresholder 244 assigns the measured minimum value as the noise variance value for the corresponding receiver path, as shown at block 514.

At block 516, noise balancer 250 identifies the lowest assigned noise variance value. At decision block 518, noise balancer 250 determines, for each receiver path, whether a corresponding assigned noise variance value is greater than the lowest assigned noise variance. In response to noise balancer 250 determining that a corresponding assigned noise variance value for a particular receiver path is greater than the lowest assigned noise variance, noise balancer 250 scales a corresponding received sample sequence and a corresponding channel response estimate by the ratio of the square root of the lowest assigned noise variance and the square root of the assigned noise variance for the corresponding receiver path, as shown at block 520. However, if at decision block 518 noise balancer 250 determines that the corresponding assigned noise variance value for the receiver path is not greater than the lowest assigned noise variance, noise balancer 250 makes no magnitude adjustments and, method proceeds to block 522. At block 522, following completion of noise balancing functions associated with the various receiver paths, detection engine 260 performs data symbol detection using the combination of unadjusted and adjusted (if any) channel response estimates and received sample sequences from noise balancer 250. The process ends at block 524.

FIG. 6 is a flow chart illustrating one embodiment of a method for performing noise thresholding and noise balancing to provide data symbol detection using a multiple input multiple output (MIMO) receiver configuration, according to one embodiment. The method of FIG. 6 begins at initiator block 601 and proceeds to block 602 at which noise estimator 228 measures a corresponding noise variance on each receiver path. At block 604, noise thresholder 244 compares measured noise variances to a threshold minimum value. At block 606, noise balancer 250 performs noise balancing to provide a same SNR across all receiver paths, based on the comparisons at noise thresholder 244. At block 608, MIMO detector 460 computes LLRs for a first transmit stream. At block 610, decoder 268 generates decoded bit streams corresponding to the first transmit stream. At block 612, MIMO detector 460 computes LLRs for the second transmit stream. At block 614, decoder 268 generates decoded bit streams corresponding to the second transmit stream. The process ends at block 616.

FIG. 7 is a flow chart illustrating one embodiment of a method for performing noise thresholding and noise balancing to provide data symbol detection using an MRC receiver configuration, according to one embodiment. The method of FIG. 7 begins at initiator block 701 and proceeds to block 702 at which noise estimator 228 measures a corresponding noise variance on each receiver path. At block 704, noise thresholder 244 compares measured noise variances to a threshold minimum value. At block 706, noise balancer 250 performs noise balancing to provide same SNR across all receiver paths, based on comparisons at noise thresholder 244. At block 708, detection engine 260 multiplies one or both of: (a) a complex conjugate of a channel response estimate by the received sample sequence for each receiver path to generate a set of equalized signals; and (b) the complex conjugate of a channel response estimate by the channel response estimate for each receiver path to generate a set of channel gains. At block 710, detection ML engine 266 adds, using combiner 264, the results of the "multiplies" including the combining of equalized signals over all receiver paths. At block 712, detection engine 266 multiplies the combined equalized signals by the inverse of the lowest assigned noise variance value. At block 714, detection engine 266 computes LLRs for bits in the complex constellation for the transmitted data symbol. At block 716, decoder 268 generates decoded bit streams based on the computed LLRs. The process ends at block 718.

The flowcharts and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

---

A1
Equations describing System Model, Noise Thresholding and Noise Balancing $$x' = \begin{bmatrix} x'_0 \\ x'_1 \end{bmatrix} = H's + n' = \begin{bmatrix} h'_{00} & h'_{01} \\ h'_{10} & h'_{11} \end{bmatrix} \begin{bmatrix} s_0 \\ s_1 \end{bmatrix} + \begin{bmatrix} n'_0 \\ n'_1 \end{bmatrix} \quad (1)$$

$$x = \begin{bmatrix} x_0 \\ x_1 \end{bmatrix} = Hs + n = \begin{bmatrix} h_{00} & h_{01} \\ h_{10} & h_{11} \end{bmatrix} \begin{bmatrix} s_0 \\ s_1 \end{bmatrix} + \begin{bmatrix} n_0 \\ n_1 \end{bmatrix},$$

where $\sigma'_0 = \sqrt{E\{|n'_0|^2\}}$, $\sigma'_1 = \sqrt{E\{|n'_1|^2\}}$ $\sigma = \sqrt{E\{|n_0|^2\}} = \sqrt{E\{|n_1|^2\}}$ $$\sigma = \min(\sigma'_0, \sigma'_1) \quad (2)$$

$x_0 = x'_0 \cdot \frac{\sigma'_1}{\sigma'_0}$, $x_1 = x'_1$ when $\sigma'_0 > \sigma'_1$ $x_0 = x'_0$, $x_1 = x'_1 \cdot \frac{\sigma'_0}{\sigma'_1}$ when $\sigma'_0 <= \sigma'_1$ $h_{00} = h'_{00} \cdot \frac{\sigma'_1}{\sigma'_0}$, $h_{01} = h_{01} \cdot \frac{\sigma'_1}{\sigma'_0}$ when $\sigma'_0 > \sigma'_1$ $h_{00} = h'_{00}$, $h_{01} = h'_{01}$ when $\sigma'_0 <= \sigma'_1$ $h_{10} = h'_{10}$, $h_{11} = h'_{11}$ when $\sigma'_0 > \sigma'_1$ $h_{10} = h'_{10} \cdot \frac{\sigma'_0}{\sigma'_1}$, $h_{11} = h_{11} \cdot \frac{\sigma'_0}{\sigma'_1}$ when $\sigma'_0 <= \sigma'_1$

| A2 |
|---|
| Equations, expressions and parameters describing MRC equalization and gain scaling |
| $\sigma_0^2, \sigma_1^2$                                    (3) <br> $h_0^* x_0, h_1^* x_1, h_0^* h_0, h_1^* h_1$ <br> $h_0^* x_0, + h_1^* x_1, h_0^* h_0 + h_1^* h_1$ |
| $y = (h_0^* x_0 + h_1^* x_1) \cdot \frac{1}{\sigma^2}, \mu = (h_0^* h_0 + h_1^* h_1) \cdot \frac{1}{\sigma^2}$    (4) |

What is claimed is:

1. A method for efficiently detecting data symbols in a diversity combining receiver configuration of a baseband modem integrated circuit (BMIC), the method comprising:

measuring a noise variance on each of a plurality of receiver paths corresponding to a plurality of antennas that are communicatively connected to the BMIC;

implementing a noise thresholding procedure that (1) compares a measured noise variance on each of the receiver paths to a pre-established threshold minimum value for noise variance and (2) based on a result of the comparison, assigns a noise variance value to each of the plurality of receiver paths by assigning (a) a corresponding measured noise variance value for each first receiver path having a measured noise variance that is larger than the pre-established threshold minimum and (b) the pre-established threshold minimum value for each second receiver path having a measured noise variance that is less than or equal to the pre-established threshold minimum value;

performing noise balancing to scale a magnitude of at least one of (a) a received sample sequence and (b) a channel response estimate, to cause received sample sequences across the plurality of receiver paths to have a substantially equivalent signal-to-noise ratio, wherein the noise balancing generates an adjusted received sample sequence and an adjusted channel response estimate for each first receiver path that has an assigned noise variance value that is greater than a lowest assigned noise variance value from among the assigned noise variance values; and performing data symbol detection associated with the plurality of receiver paths utilizing (1) the adjusted received sample sequence and the adjusted channel response estimate for each first receiver path that has an assigned noise variance value that is greater than the lowest assigned noise variance value and (2) a received sample sequence and channel response estimate for each receiver path that has an assigned noise variance value that is equal to the lowest assigned noise variance value.

2. The method of claim 1, wherein said implementing a noise thresholding procedure further comprises:

in response to identifying at least one second receiver path among the plurality of receiver paths, assigning the pre-established threshold minimum value as the assigned noise variance value corresponding to each of the at least one second receiver path identified; and in response to identifying at least one first receiver path, assigning the measured noise variance as the assigned noise variance value corresponding to each of the at least one first receiver path.

3. The method of claim 2, wherein said performing noise balancing further comprises:

identifying the lowest assigned noise variance value from among the assigned noise variance values;

determining whether at least one first receiver path has an assigned noise variance value that is greater than the lowest assigned noise variance value; and in response to determining that at least one first receiver path has an assigned noise variance value that is greater than the lowest assigned noise variance value, reducing a magnitude of at least one of a channel estimate and a received sample sequence corresponding to each of the at least one first receiver path;

wherein an amount of magnitude reduction is determined based on a ratio of a square root of the lowest assigned noise variance value and a square root of a higher, assigned noise variance value corresponding to first receiver path; wherein the amount of magnitude reduction enables received sample sequences of the plurality of receiver paths to have a substantially equivalent signal to noise ratio; and wherein the magnitude reduction on at least one first receiver path is performed to prevent signal clipping of the received sample sequence and to preserve a dynamic range of the received sample sequence corresponding to the at least one receiver path having an assigned noise variance value equal to the lowest assigned noise variance value.

4. The method of claim 3, wherein said performing data symbol detection further comprises:

generating an equalized received signal for each of the plurality of receiver paths by utilizing: (a) a received sample sequence and a channel response estimate for a receiver path that has an assigned noise variance value equal to the lowest assigned noise variance value; and (b) the adjusted received sample sequence and the adjusted channel response estimate for a first receiver path with an assigned noise variance value that is greater than the lowest assigned noise variance value;

adding together each equalized received signal for each corresponding receiver path to provide an equalized combined signal; and generating a scaled, equalized combined signal by multiplying the equalized combined signal by a mathematical inverse of the lowest assigned noise variance value.

5. The method of claim 4, wherein said generating an equalized received signal further comprises:

multiplying a channel response estimate by a received sample sequence corresponding to each of the plurality of receiver paths that has an assigned noise variance value that is equal to the lowest assigned noise variance value, wherein the multiplying provides at least one corresponding equalized received signal; and multiplying an adjusted channel response estimate by an adjusted received sample sequence for each first receiver path whose assigned noise variance value is greater than the lowest assigned noise variance value to provide at least one corresponding equalized received signal; and wherein the equalized received signal for each receiver path has a gain that is substantially equivalent to a square of a channel magnitude of one of the channel response estimate and the adjusted channel response estimate.

6. The method of claim 4, wherein said generating the scaled, equalized combined signal further comprises:

performing a single multiply operation involving multiplying the equalized combined signal by a mathematical inverse of the lowest assigned noise variance value;

wherein performing the single multiply operation includes first generating an equalized combined signal in order to scale the equalized combined signal;

wherein said single multiply operation enables the BMIC to reduce a number of operations and an amount of processing resources required to process received data.

7. The method of claim 1, wherein said performing data symbol detection further comprises performing at least one of bit probability detection and log likelihood ratios (LLRs) utilizing at least one of: (a) a received sample sequence and a channel response estimate for a corresponding receiver path and (b) an adjusted received sample sequence and an adjusted channel response estimate for a first receiver path.

8. The method of claim 1, wherein said performing data symbol detection is executed in a diversity combining receiver configuration via one of (a) maximal ratio combining (MRC) processing, (b) maximum likelihood (ML) processing, (c) maximum likelihood successive interference cancellation (ML-SIC) processing, and (d) minimum mean square error (MMSE) processing.

9. A baseband modem integrated circuit (BMIC) comprising:
- a noise variance estimator that measures a noise variance on each of a plurality of receiver paths corresponding to a plurality of antennas that are communicatively connected to the BMIC;
- a channel estimator that provides a channel response estimate for each receiver path;
- a noise thresholder that (1) compares a measured noise variance on each of the receiver paths to a pre-established threshold minimum value for noise variance and (2) based on a result of the comparison, assigns a noise variance value to each of the plurality of receiver paths by assigning (a) a corresponding measured noise variance value for each first receiver path having a measured noise variance that is larger than the pre-established threshold minimum and (b) the pre-established threshold minimum value for each second receiver path having a measured noise variance that is less than or equal to the pre-established threshold minimum value;
- a noise balancer that performs noise balancing to scale a magnitude of at least one of (a) a received sample sequence and (b) a channel response estimate, to cause received sample sequences across the plurality of receiver paths to have a substantially equivalent signal-to-noise ratio, wherein the noise balancing generates an adjusted received sample sequence and an adjusted channel response estimate for each first receiver path that has an assigned noise variance value that is greater than a lowest assigned noise variance value from among the assigned noise variance values; and
- a detection engine that performs data symbol detection associated with the plurality of receiver paths utilizing (1) the adjusted received sample sequence and the adjusted channel response estimate for each first receiver path that has an assigned noise variance value that is greater than the lowest assigned noise variance value and (2) a received sample sequence and channel response estimate for each receiver path that has an assigned noise variance value that is equal to the lowest assigned noise variance value.

10. The BMIC of claim 9, wherein the noise thresholder:
in response to identifying at least one second receiver path among the plurality of receiver paths, assigns the pre-established threshold minimum value as the assigned noise variance value corresponding to each of the at least one second receiver path identified; and in response to identifying at least one first receiver path, assigns the measured noise variance as the assigned noise variance value corresponding to each of the at least one first receiver path.

11. The BMIC of claim 10, wherein the noise balancer:
identifies the lowest assigned noise variance value from among the assigned noise variance values;
determines whether at least one first receiver path has an assigned noise variance value that is greater than the lowest assigned noise variance value; and
in response to determining that at least one first receiver path has an assigned noise variance value that is greater than the lowest assigned noise variance value, reduces a magnitude of at least one of a channel estimate and a received sample sequence corresponding to each of the at least one first receiver path;
wherein an amount of magnitude reduction is determined based on a ratio of a square root of the lowest assigned noise variance value and a square root of a higher, assigned noise variance value corresponding to first receiver path; wherein the amount of magnitude reduction enables received sample sequences of the plurality of receiver paths to have a substantially equivalent signal to noise ratio; and wherein the magnitude reduction on at least one first receiver path is performed to prevent signal clipping of the received sample sequence and to preserve a dynamic range of the received sample sequence corresponding to the at least one receiver path having an assigned noise variance value equal to the lowest assigned noise variance value.

12. The BMIC of claim 11, wherein the detection engine:
generates an equalized received signal for each of the plurality of receiver paths by utilizing: (a) a received sample sequence and a channel response estimate for a receiver path that has an assigned noise variance value equal to the lowest assigned noise variance value; and (b) the adjusted received sample sequence and the adjusted channel response estimate for a first receiver path with an assigned noise variance value that is greater than the lowest assigned noise variance value;
adds together each equalized received signal for each corresponding receiver path to provide an equalized combined signal; and
generates a scaled, equalized combined signal by multiplying the equalized combined signal by a mathematical inverse of the lowest assigned noise variance value.

13. The BMIC of claim 12, wherein the detection engine:
multiplies a channel response estimate by a received sample sequence corresponding to each of the plurality of receiver paths that has an assigned noise variance value that is equal to the lowest assigned noise variance value, wherein the multiplying provides at least one corresponding equalized received signal; and
multiplies an adjusted channel response estimate by an adjusted received sample sequence for each first receiver path whose assigned noise variance value is greater than the lowest assigned noise variance value to provide at least one corresponding equalized received signal; and
wherein the equalized received signal for each receiver path has a gain that is substantially equivalent to a square of a channel magnitude of one of the channel response estimate and the adjusted channel response estimate.

14. The BMIC of claim 12, wherein the detection engines generates the scaled, equalized combined signal by:
performing a single multiply operation involving multiplying the equalized combined signal by a mathematical inverse of the lowest assigned noise variance value;

wherein performing the single multiply operation includes first generating an equalized combined signal in order to scale the equalized combined signal; and wherein said single multiply operation enables the BMIC to reduce a number of operations and an amount of processing resources required to process received data.

15. The BMIC of claim 9, wherein the detection engine performs data symbol detection by performing at least one of bit probability detection and log likelihood ratios (LLRs) utilizing at least one of: (a) a received sample sequence and a channel response estimate for a corresponding receiver path and (b) an adjusted received sample sequence and an adjusted channel response estimate for a first receiver path.

16. The BMIC of claim 9, wherein the detection engine performs data symbol detection in a diversity combining receiver configuration via one of (a) maximal ratio combining (MRC) processing, (b) maximum likelihood (ML) processing, (c) maximum likelihood successive interference cancellation (ML-SIC) processing, and (d) minimum mean square error (MMSE) processing.

17. A wireless communication device having a baseband modem integrated circuit (BMIC), wherein said BMIC comprises:

a noise variance estimator that measures a noise variance on each of a plurality of receiver paths corresponding to a plurality of antennas that are communicatively connected to the BMIC;

a channel estimator that provides a channel response estimate for each receiver path;

a noise thresholder that (1) compares a measured noise variance on each of the receiver paths to a pre-established threshold minimum value for noise variance and (2) based on a result of the comparison, assigns a noise variance value to each of the plurality of receiver paths by assigning (a) a corresponding measured noise variance value for each first receiver path having a measured noise variance that is larger than the pre-established threshold minimum and (b) the pre-established threshold minimum value for each second receiver path having a measured noise variance that is less than or equal to the pre-established threshold minimum value;

a noise balancer that performs noise balancing to scale a magnitude of at least one of (a) a received sample sequence and (b) a channel response estimate, to cause received sample sequences across the plurality of receiver paths to have a substantially equivalent signal-to-noise ratio, wherein the noise balancing generates an adjusted received sample sequence and an adjusted channel response estimate for each first receiver path that has an assigned noise variance value that is greater than a lowest assigned noise variance value from among the assigned noise variance values; and a detection engine that performs data symbol detection associated with the plurality of receiver paths utilizing (1) the adjusted received sample sequence and the adjusted channel response estimate for each first receiver path that has an assigned noise variance value that is greater than the lowest assigned noise variance value and (2) a received sample sequence and channel response estimate for each receiver path that has an assigned noise variance value that is equal to the lowest assigned noise variance value.

18. The wireless communication device of claim 17, wherein the noise thresholder:

in response to identifying at least one second receiver path among the plurality of receiver paths, assigns the pre-established threshold minimum value as the assigned noise variance value corresponding to each of the at least one second receiver path identified;

in response to identifying at least one first receiver path, assigns the measured noise variance as the assigned noise variance value corresponding to each of the at least one first receiver path; and triggers the noise balancer to:
identify the lowest assigned noise variance value from among the assigned noise variance values;
determine whether at least one first receiver path has an assigned noise variance value that is greater than the lowest assigned noise variance value; and
in response to determining that at least one first receiver path has an assigned noise variance value that is greater than the lowest assigned noise variance value, reduce a magnitude of at least one of a channel estimate and a received sample sequence corresponding to each of the at least one first receiver path;

wherein an amount of magnitude reduction is determined based on a ratio of a square root of the lowest assigned noise variance value and a square root of a higher, assigned noise variance value corresponding to first receiver path; wherein the amount of magnitude reduction enables received sample sequences of the plurality of receiver paths to have a substantially equivalent signal to noise ratio; and wherein the magnitude reduction on at least one first receiver path is performed to prevent signal clipping of the received sample sequence and to preserve a dynamic range of the received sample sequence corresponding to the at least one receiver path having an assigned noise variance value equal to the lowest assigned noise variance value.

19. The wireless communication device of claim 18, wherein the detection engine:

generates an equalized received signal for each of the plurality of receiver paths by utilizing: (a) a received sample sequence and a channel response estimate for a receiver path that has an assigned noise variance value equal to the lowest assigned noise variance value; and (b) the adjusted received sample sequence and the adjusted channel response estimate for a first receiver path with an assigned noise variance value that is greater than the lowest assigned noise variance value;

adds together each equalized received signal for each corresponding receiver path to provide an equalized combined signal; and generates a scaled, equalized combined signal by multiplying the equalized combined signal by a mathematical inverse of the lowest assigned noise variance value;

wherein the detection engine:
multiplies a channel response estimate by a received sample sequence corresponding to each of the plurality of receiver paths that has an assigned noise variance value that is equal to the lowest assigned noise variance value, wherein the multiplying provides at least one corresponding equalized received signal; and multiplies an adjusted channel response estimate by an adjusted received sample sequence for each first receiver path whose assigned noise variance value is greater than the lowest assigned noise variance value to provide at least one corresponding equalized received signal; and wherein the equalized received signal for each receiver path has a gain that is substantially equivalent to a square of a channel magnitude of one of the channel response estimate and the adjusted channel response estimate;

wherein the detection engines generates the scaled, equalized combined signal by performing a single multiply operation involving multiplying the equalized combined signal by a mathematical inverse of the lowest assigned noise variance value;

wherein performing the single multiply operation includes first generating an equalized combined signal in order to scale the equalized combined signal; and wherein said single multiply operation enables the BMIC to reduce a number of operations and an amount of processing resources required to process received data.

20. The wireless communication device of claim 17, wherein the detection engine:

performs data symbol detection by performing at least one of bit probability detection and log likelihood ratios (LLRs) utilizing at least one of: (a) a received sample sequence and a channel response estimate for a corresponding receiver path and (b) an adjusted received sample sequence and an adjusted channel response estimate for a first receiver path; and wherein data symbol detection is executed in a diversity combining receiver configuration via one of (a) maximal ratio combining (MRC) processing, (b) maximum likelihood (ML) processing, (c) maximum likelihood successive interference cancellation (ML-SIC) processing, and (d) minimum mean square error (MMSE) processing.

\* \* \* \* \*